US008342864B1

(12) United States Patent
Matsuoka

(10) Patent No.: US 8,342,864 B1
(45) Date of Patent: *Jan. 1, 2013

(54) COMBINATION TERMINAL

(75) Inventor: Yoshimichi Matsuoka, Cupertino, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/419,316

(22) Filed: Mar. 13, 2012

Related U.S. Application Data

(63) Continuation of application No. 13/299,223, filed on Nov. 17, 2011, now Pat. No. 8,157,575.

(51) Int. Cl.
*H01R 13/44* (2006.01)

(52) U.S. Cl. .......... 439/131; 439/172; 361/737; 710/62; 711/115

(58) Field of Classification Search .................. 439/131, 439/172, 638, 374, 379; 361/737, 715, 727, 361/683, 684, 685, 686; 235/451; 710/62; 711/114, 115, E12.019, E12.098
See application file for complete search history.

(56) References Cited

U.S. PATENT DOCUMENTS

| | | | | |
|---|---|---|---|---|
| 4,631,637 A * | 12/1986 | Romania et al. | ............... | 361/788 |
| 6,744,634 B2 | 6/2004 | Yen | | |
| 7,108,560 B1 * | 9/2006 | Chou et al. | ................... | 439/660 |
| 7,440,286 B2 | 10/2008 | Hiew et al. | | |
| 7,440,287 B1 * | 10/2008 | Ni et al. | ........................ | 361/752 |
| 7,850,082 B1 | 12/2010 | Chow et al. | | |
| 8,157,575 B1 * | 4/2012 | Matsuoka | ..................... | 439/131 |
| 2003/0095386 A1 | 5/2003 | Le et al. | | |
| 2004/0087213 A1 | 5/2004 | Kao | | |

OTHER PUBLICATIONS

Blog:: Craig Principal—Tablet and Mobility Mustangs, Introducing the TC4400, http://www.pringle.net.nz.blog/PermaLink,.Luid,b8c5f5e4-67de-4961-9a5a-a085ea20dbf5.aspx,May 12, 2006.
"SanDisk Secure Digital Card," Product Manual, Version 1.9, Document No. 80-13-00169,SanDisk Corporation, Sunnyvale, California Dec. 2003.
"Secure Digital Memory Sockets," Adam Tech, Adam technologies, Inc., Union New Jersey. (No data available), no date.
"Universal Serial Bus Specification," Revision 2.0 Compaq Computer Corporation, Hewlett-Packard Corporation, Intel Corporation, Lucent Technologies Inc., Microsoft Corporation, NEC Corporation, Koninklijke Philips electronics N.V., Apr. 27, 2000.

* cited by examiner

*Primary Examiner* — Edwin A. Leon

(57) ABSTRACT

A combination terminal includes a first logic circuit that is configured to interface with a first device using a first protocol. The combination terminal also includes a second logic circuit configured to interface with a second device using a second protocol. The combination terminal includes a retractable portion that includes a first plurality of contacts and retracts based upon an insertion of the second device; connects a first portion of the first device with the first logic circuit; and selects an active logic circuit. The combination terminal includes a static portion comprising a second plurality of contacts and connects the second device with the second logic circuit; and connects a second portion of the first device with the first logic circuit using the second plurality of contacts. The first device is connected to the first logic circuit using the first plurality of contacts and the second plurality of contacts.

20 Claims, 4 Drawing Sheets

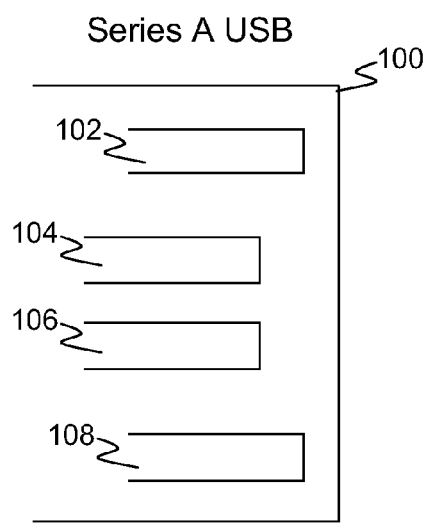
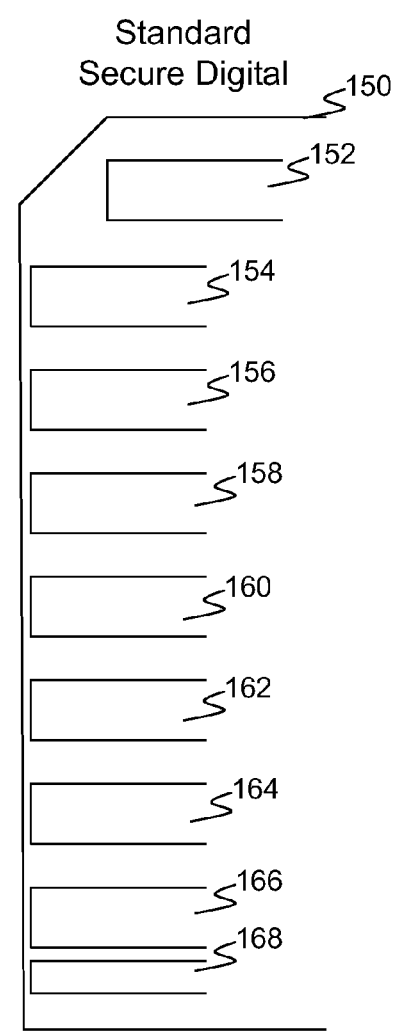
FIG. 1A
Prior Art
FIG. 1B
Prior Art

COMBINATION TERMINAL

CONTINUITY DATA

The present application is a continuation of, and claims priority to, U.S. patent application Ser. No. 13/299,223, filed Nov. 17, 2011.

BACKGROUND

Form factors of computing devices, such as laptops, tablets, cell phones, personal digital assistants (PDAs), etc., generally continue to become smaller and smaller. In addition, various input and output ports/slots such as universal serial bus (USB) ports, secure digital (SD) slots, etc., can be integrated into computing devices.

SUMMARY

In general, one aspect of the subject matter described in this specification can be embodied in a combination terminal that includes a first logic circuit that is configured to interface with a first insertable device using a first protocol. The combination terminal also includes a second logic circuit configured to interface with a second insertable device using a second protocol. The first protocol and the second protocol are different. The combination terminal also includes a retractable portion that includes a first plurality of contacts. The retractable portion is configured to retract based upon an insertion of the second insertable device; connect a first portion of the first insertable device with the first logic circuit using the first plurality of contacts; and select an active logic circuit from the first logic circuit or the second logic circuit. The combination terminal also includes a static portion comprising a second plurality of contacts. The static portion is configured to connect the second insertable device with the second logic circuit using the second plurality of contacts; and connect a second portion of the first insertable device with the first logic circuit using the second plurality of contacts. The first insertable device is connected to the first logic circuit based upon the first plurality of contacts in conjunction with the second plurality of contacts. Other implementations of this aspect include corresponding systems, apparatuses, and methods.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

FIG. 1A illustrates contacts of a USB series A plug.

FIG. 1B illustrates contacts of an SD card.

Like reference numbers and designations in the various drawings indicate like elements.

DETAILED DESCRIPTION

Figure 2:
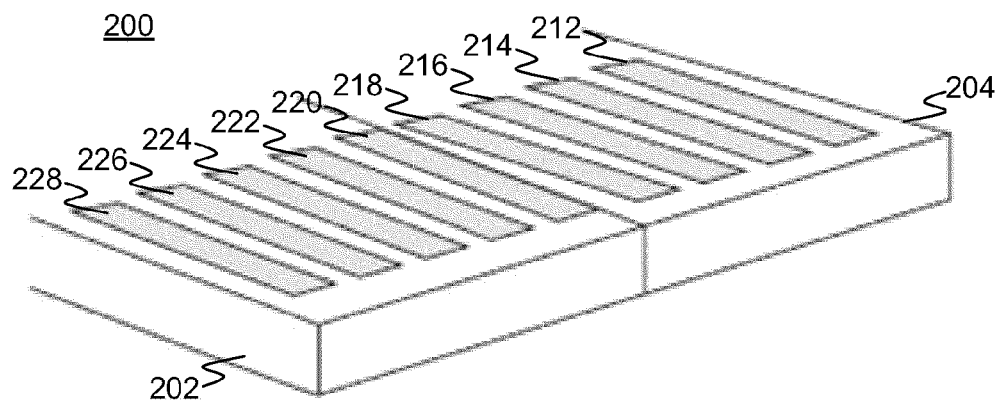
FIG. 2 illustrates a combination terminal in an unretracted state in accordance with an illustrative implementation.

Computing devices can connect to various devices and modules. USB offers one way in which various devices can connect to other devices. For example, a mouse, keyboard, hard drive, etc., can be connected to a computer device or other device using a USB port. USB supports numerous different form factors. One example is a USB series "A" plug that includes four contacts aligned in series. FIG. 1A illustrates contacts of a USB series A plug 100. A USB series "A" plug can be inserted into a corresponding USB series "A" receptacle. Contacts 102, 104, 106, and 108 can come into physical contact with corresponding contacts of the receptacle. From these contacts, data can be sent/received between the connected devices. The width of the contacts 102, 104, 106, and 108 can be 1.00 millimeters (mm) in width +/−0.05 mm. In addition, the space between the centers of contacts 104 and 106 can be 2.00 mm +/−0.05 mm. The space between the centers of contacts 102 and 104 can be 2.50 mm +/0 0.05 mm.

Memory cards can be connected to devices using various slots, including an SD slot. Similar to USB, there are various form factors for SD memory cards. One such form factor is the standard SD form factor. FIG. 1B illustrates contacts of a standard SD card 150. The SD card 150 can be inserted into a corresponding SD card receptacle. The SD card 150 has contacts 152-168 that can come into physical contact with corresponding contacts of the receptacle. The contacts 152-164 can have a width of 1.40 mm and a spacing of 1.10 mm. The widths of the contacts 166 and 168 can be 1.10 mm and 0.90 mm, respectively. The spacing between contacts 166 and 168 can be 0.07 mm, and the spacing between contacts 164 and 166 can be 1.15 mm. The various widths and relative positions disclosed regarding the contacts of the SD card 150 have a general tolerance of +/−0.15 mm.

From these contacts, data can be sent/received between the device and the memory card.

FIG. 2 illustrates a combination terminal in an unretracted state in accordance with an illustrative implementation. In one implementation, the combination terminal 200 has two portions, a retractable portion 202 and a static portion 204. The static portion 204 is fixed and does not move. In other implementations, the combination terminal 200 can include multiple retractable portions and a static portion. In one implementation, the static portion 204 includes four contacts 212-218, and the retractable portion 202 includes five contacts 220-228. The contacts can be made of any conductive material such as, but not limited to, gold. The retractable portion 202 can be in one of two states, a retracted state and an unretracted state.

Figure 3:
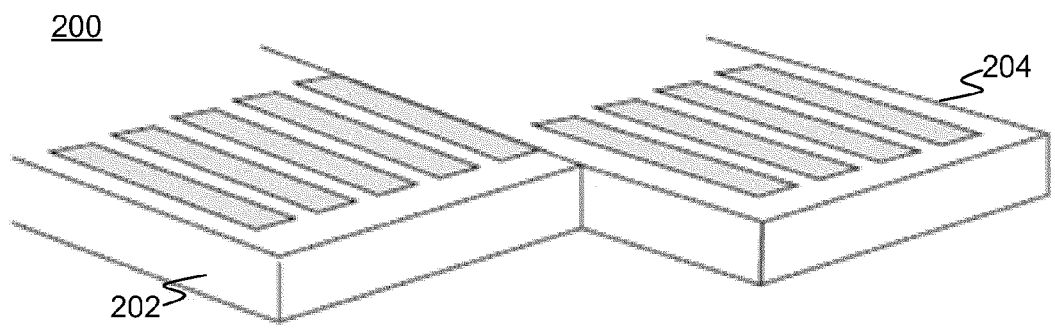
FIG. 3 illustrates a combination terminal in a retracted state in accordance with an illustrative implementation.
Figure 4:
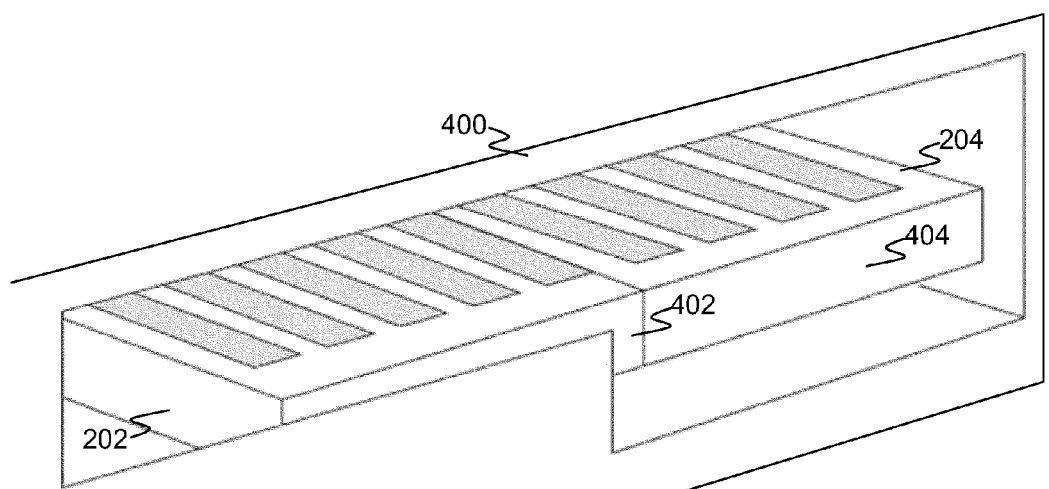
FIG. 4 illustrates a combination terminal in a housing in accordance with an illustrative implementation.

FIG. 3 illustrates a combination terminal in a retracted state in accordance with an illustrative implementation. In some implementations, the combination terminal can be housed in a computing device. FIG. 4 illustrates a combination terminal in a housing in accordance with an illustrative implementation. In one implementation, housing 400 is a housing of a computing device. The housing 400 can expose all of the contacts of the combination terminal. The housing 400 can also expose a portion of a face 402 of the retractable portion 202 and the entire face 404 of the static portion 204. The exposed portion of the face 402 can be used to move the retractable portion 202 into the retracted state. In one implementation, the retractable portion 202 can be operably connected to a spring. In this implementation, the retractable portion 202 is spring loaded, such that the retractable portion 202 moves into the unretracted state when pressure is not asserted against the retractable portion 202. For example, an insertable device can interact with only the contacts of the static portion 204. In this example, the insertable device can contact the exposed portion of the face 402 and when the insertable device is inserted move the retractable portion 202 into a retracted state.

Referring to FIGS. 1A and 1B, the spacing and size of the USB contacts 102, 104, 106, and 108 are similar, although not exactly the same, compared to the spacing and size of the contacts 152-168 of the SD card 150. Accordingly, in one implementation the combination terminal can be used to connect either a series A USB plug or an SD memory card. In this implementation, the contacts 212-218 of the static portion 204 can be used to connect both the USB plug and a portion the SD memory card to a device. The contacts 212-218 of the static portion combined with the contacts 220-228 of the retractable portion can be used to connect the SD memory card with the device. Because contacts 212-218 are used to connect both the USB plug and the SD memory card, these contacts serve dual purposes based upon the type of device inserted into the combination terminal.

Figure 5:
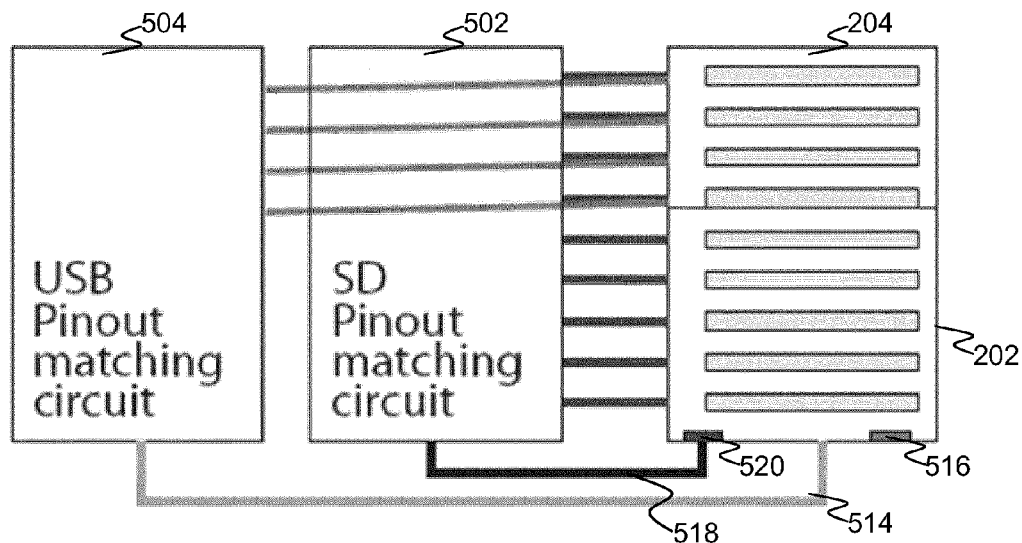
FIG. 5 illustrates a combination terminal in an unretracted state in accordance with an illustrative implementation.

To interact with either a USB plug or an SD memory card, two different types of logic circuits can be used. The logic circuits interact with either the USB plug or the SD memory card to read/write data to/from the USB plug or the SD memory card. In one implementation, the two different logic circuits can be separate logic circuits. In another implementation, the two logic circuits can be combined into a single logic circuit that can interact with either a USB plug or an SD memory card. The retractable portion 202 can include two additional contacts 516 and 520. These contacts can be used to select between two different circuits/logics 502 and 504 that can be used to interact with an SD memory card or a USB plug, respectively. FIG. 5 illustrates a combination terminal in an unretracted state in accordance with an illustrative implementation. In the unretracted state, contact 520 is physically connected through an interconnect 518 to a first logic circuit 502. In this state, a second logic circuit 504 is not connected to the combination terminal through the contact 516. In one implementation, this logic circuit can be used to interact with an SD memory card. In this implementation, both the contacts from the retractable portion 202 and the static portion 204 are interconnected to the first logic circuit 502.

Figure 6:
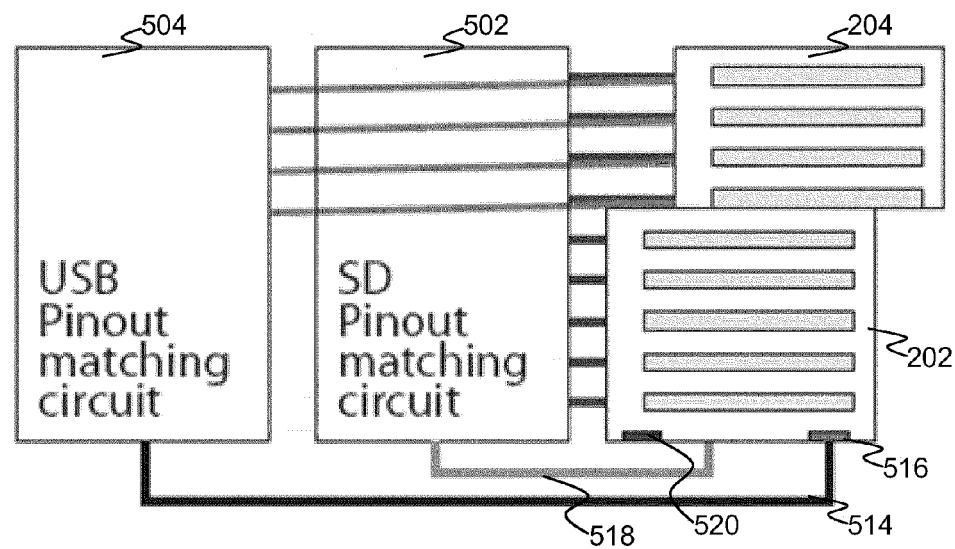
FIG. 6 illustrates a combination terminal in a retracted state in accordance with an illustrative implementation.

When the retractable portion 202 is moved into the retracted state, the retractable portion connects to the second logic circuit 504 using the contact 516 through an interconnect 514. Accordingly, the first logic circuit 502 is not connected to the combination terminal through the contact 520. FIG. 6 illustrates a combination terminal in a retracted state in accordance with an illustrative implementation. In one implementation, the second logic circuit 504 can be used to interact with a USB plug. In this implementation, the four contacts of the static portion 204 are connected to the second logic circuit 504. In some implementations, the contacts of the retractable portion can be inactive when the combination terminal is in the retracted state, as they are not needed to interact with a USB plug.

In one implementation, the combination terminal can be used to connect either a USB plug or an SD memory card. When inserted, the USB plug will move the retractable portion 202 into a retracted state, such that data can be sent/received through the USB plug using the second logic circuit 504. When a USB plug is not inserted, the retractable portion 202 is in an unretracted state. In this state, when an SD memory card is inserted, the combination terminal can be used to read/write data to/from the SD memory card using the first logic circuit 502.

The term "computing device" encompasses all kinds of apparatus, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A terminal comprising:
   a first logic circuit configured to interface with a first insertable device using a first protocol;
   a second logic circuit configured to interface with a second insertable device using a second protocol, wherein the first protocol and the second protocol are different;
   a movable portion, comprising a first plurality of contacts, configured to:
      move in response to an insertion of the second insertable device;
      couple a first portion of the first insertable device with the first logic circuit using the first plurality of contacts; and
      select a logic circuit from the first logic circuit or the second logic circuit; and
   a second portion, comprising a second plurality of contacts, configured to:
      couple the second insertable device with the second logic circuit using the second plurality of contacts; and
      couple a second portion of the first insertable device with the first logic circuit using the second plurality of contacts, wherein the first insertable device is coupled to the first logic circuit based upon the first plurality of contacts in conjunction with the second plurality of contacts.

2. The terminal of claim 1, wherein the second protocol is universal serial bus (USB) protocol.

3. The terminal of claim 2, wherein the second plurality of contacts is configured to interface with a USB type A plug.

4. The terminal of claim 3, wherein the second protocol is a secure protocol.

5. The terminal of claim 4, wherein the first plurality of contacts and the second plurality of contacts are configured to interface with a standard secure digital card.

6. The terminal of claim 1, wherein the first plurality of contacts are inactive when the movable portion is retracted.

7. The terminal of claim 1, further comprising one or more springs configured to move movable portion to an unretracted state when the first device is removed from the terminal.

8. The terminal of claim 1, wherein a portion of the movable portion is configured to contact the second device when the second device is inserted, and wherein the movable portion is configured to retract based upon the contact.

9. A computing device comprising:
a processor;
a memory operably coupled to the processor;
a terminal; and
a housing configured to house the processor, the memory, and the terminal, wherein the terminal comprises:
a first logic circuit configured to interface with a first insertable device using a first protocol;
a second logic circuit configured to interface with a second insertable device using a second protocol, wherein the first protocol and the second protocol are different;
a movable portion comprising a first plurality of contacts configured to:
move based upon an insertion of the second insertable device, connect a first portion of the first insertable device with the first logic circuit using the first plurality of contacts, and
select an active logic circuit from the first logic circuit or the second logic circuit; and
a static portion comprising a second plurality of contacts configured to:
connect the second insertable device with the second logic circuit using the second plurality of contacts, and
connect a second portion of the first insertable device with the first logic circuit using the second plurality of contacts, wherein the first insertable device is connected to the first logic circuit based upon the static portion in conjunction with the movable portion.

10. The computing device of claim 9, wherein the first protocol is a secure digital protocol.

11. The computing device of claim 10, wherein the first plurality of contacts and the second plurality of contacts are configured to interface with a standard secure digital card.

12. The computing device of claim 11, wherein the second protocol is universal serial bus (USB) protocol.

13. The computing device of claim 12, wherein the second plurality of contacts is configured to interface with a USB type A plug.

14. The computing device of claim 9, wherein the housing is a housing of a laptop computer, a cell phone, a tablet computer, or a personal digital assistant.

15. The computing device of claim 9, further comprising one or more springs configured to move the movable portion to an unretracted state when the first device is removed from the terminal.

16. The computing device of claim 9, wherein the movable portion is configured to contact the second device when the second device is inserted, and wherein the movable portion is configured to move based upon the contact.

17. A method comprising:
receiving a first insertable device for coupling to a first logic circuit, wherein the first logic circuit interfaces with the first insertable device using a first protocol, wherein the first insertable device is connected to the first logic circuit through first contacts on a movable portion of a terminal and second contacts on a second portion of the terminal;
moving the movable portion of the terminal in response to contact with a second insertable device;
connecting the second insertable device to a second logic circuit, wherein the first logic circuit interfaces with the second insertable device using a second protocol, wherein the first protocol and the second protocol are different, wherein the second insertable device connected to the second logic circuit through the second contacts on the static portion of the terminal; and
selecting a logic circuit from the first logic circuit and the second logic circuit based upon a position of the movable portion of the terminal.

18. The method of claim 17, wherein the second protocol is secure digital protocol, and wherein the first plurality of contacts and the second plurality of contacts are configured to interface with a standard secure digital card.

19. The method of claim 18, wherein the second protocol is universal serial bus (USB) protocol and the second plurality of contacts is configured to interface with a USB type A plug.

20. The method of claim 16, further comprising activating the first plurality of contacts based upon the position of the movable portion of the terminal.

* * * * *